Dec. 7, 1954     E. TOPANELIAN, JR     2,696,410
JOURNAL BEARING
Filed June 8, 1949     2 Sheets-Sheet 1
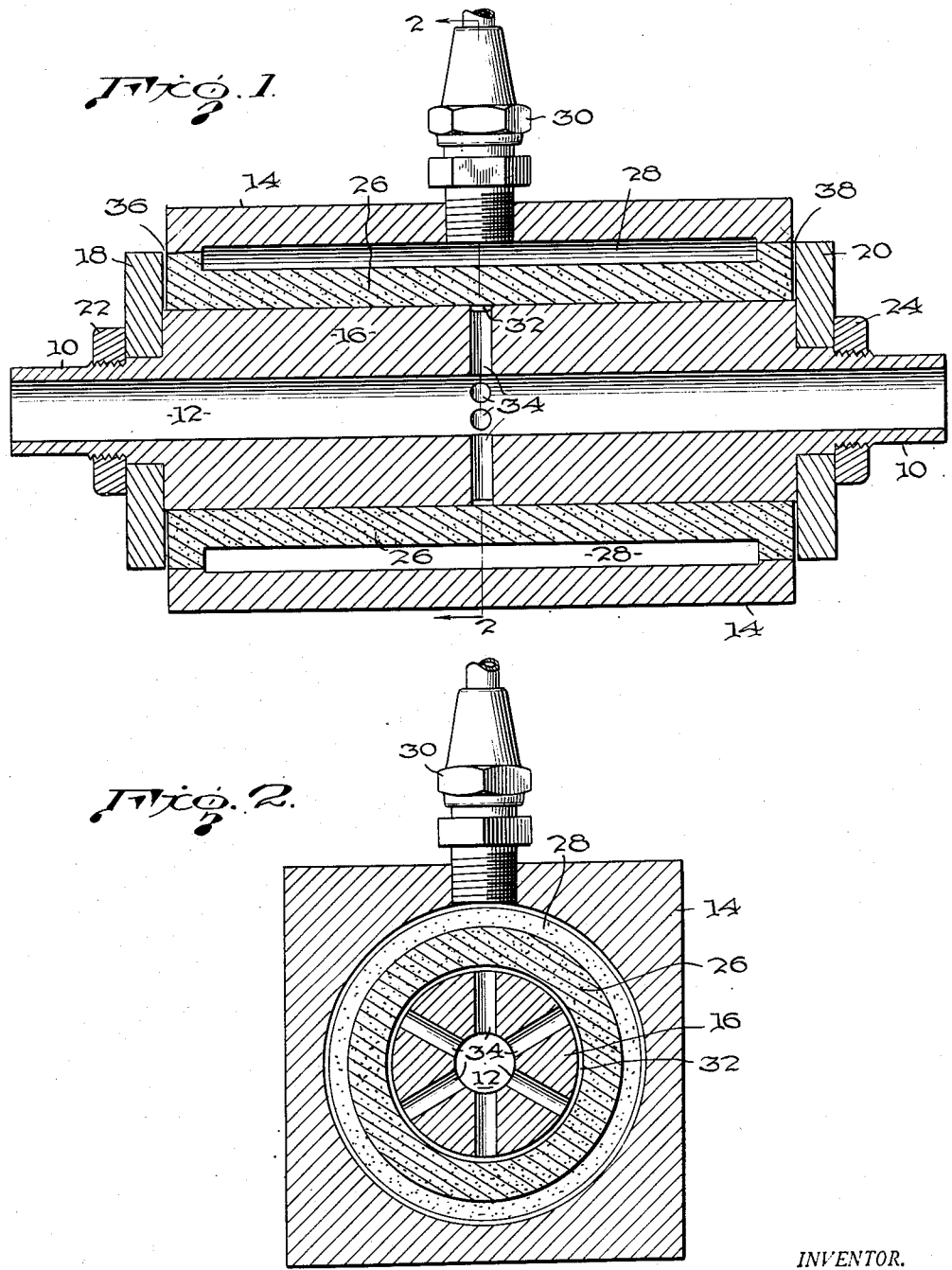
INVENTOR.
EDWARD TOPANELIAN, JR
BY
HIS ATTORNEY Dec. 7, 1954   E. TOPANELIAN, JR   2,696,410
JOURNAL BEARING
Filed June 8, 1949   2 Sheets-Sheet 2

INVENTOR.
EDWARD TOPANELIAN, JR.
BY *A. M. Houghton*
HIS ATTORNEY

United States Patent Office 2,696,410
Patented Dec. 7, 1954

2,696,410

JOURNAL BEARING

Edward Topanelian, Jr., Pittsburgh, Pa., assignor to Gulf Research & Development Company, Pittsburgh, Pa., a corporation of Delaware Application June 8, 1949, Serial No. 97,776

1 Claim. (Cl. 308—9)

This invention concerns an improved journal bearing, and more particularly concerns an improved sleeve bearing which may be lubricated with a flowing fluid whose dynamic action serves to support the shaft out of contact with the bearing sleeve so that in its preferred form the bearing may be lubricated with air or other gas even at high temperature.

In journal bearings of the type in which a shaft or journal turns in a surrounding sleeve it is well known to supply lubricant under pressure to maintain the shaft out of contact with the sleeve. Various means have even been provided for centering the shaft inside the sleeve, these means generally comprising liquid forced under pressure to pockets on the bearing surface of the sleeve. While such bearings are more or less satisfactory, they have the disadvantage of being costly to construct and the pockets materially reduce the supporting surface available for carrying load. Furthermore, because of the finite number of such pockets which can be formed in the bearing surface, there results nonuniform centering control permitting the shaft greater deflection in certain directions compared to others.

It is accordingly an object of this invention to provide a bearing of extremely simple construction in which centering action is attained by a pressure flow lubricating system.

A further object of this invention is to provide a journal bearing which has uniform centering control when lubricated with fluid flowing under pressure to the bearing.

A further object of this invention is to provide a bearing in which the lubricating fluid under pressure may be air or other gas.

A further object of this invention is to provide a bearing employing as a pressure lubricant a gas which may have an elevated temperature.

A still further object of this invention is to provide a method of lubricating a journal bearing which is relatively independent of the oiliness of the lubricant and may employ liquids other than oil or may employ gas or air.

These and other objects are accomplished by my invention which will be described with reference to the accompanying drawings forming a part of this specification, and in which Figure 1 shows an elevation, partly in cross-section, of one embodiment of my invention wherein a shaft is journaled in a sleeve;

Figure 2 shows a transverse cross-section of the embodiment of Figure 1;

Figure 3:
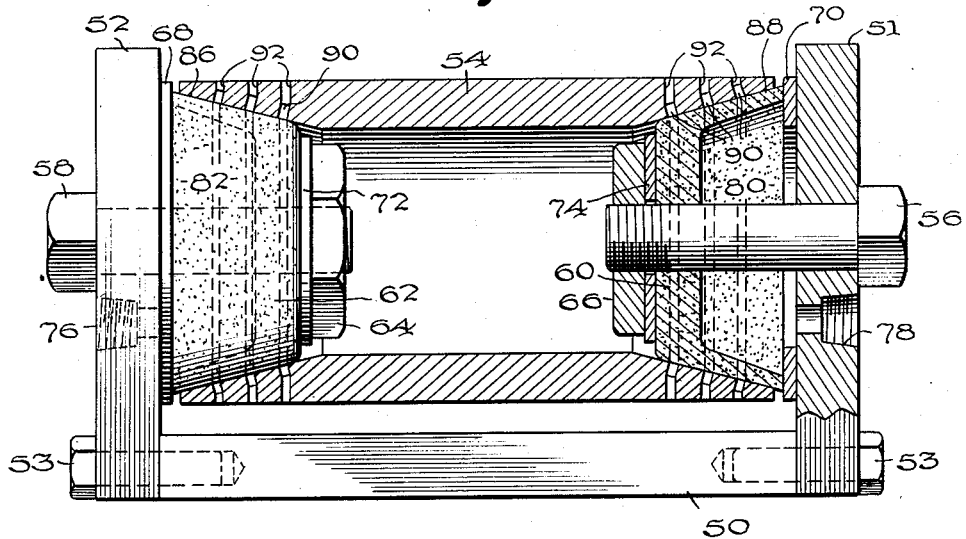
Figure 3 shows an elevation, partly in cross-section, of another embodiment of my invention wherein conical end-bearing members are employed to support a hollow shaft.

Briefly, my invention comprises the use of permeable shaft-supporting or bearing elements through which a fluid is forced under pressure to flow from a region remote from the shaft toward the shaft itself at which provision for its escape is provided. My invention makes use of the pressure-flow characteristics in a fluid-flow system of the nature described as will become evident. Inasmuch as the shaft and shaft-supporting member are maintained out of contact by these pressure characteristics it is not necessary to depend on any lubricating properties of the fluid itself, with the result that a gas such as air, engine exhaust gas, etc., may be employed, as well as the more common lubricating liquids. Furthermore, since the pressure characteristic is made use of to hold the shaft and shaft-supporting member out of contact, the material of which the latter is made is of relatively little consequence, and in one successful embodiment of my invention the shaft-supporting element has been made of permeable refractory material, for example, such as is generally used in making grinding wheels, whereby a bearing is attained which may operate at very high temperatures. Such bearings are especially useful in exhaust-gas-driven turbo-superchargers in which the temperatures are destructive to liquid lubrication.

Referring to Figure 1, numeral 10 indicates a shaft which may rotate in and be supported by a bearing case 14, the latter being part of a load-carrying structure such as a pillow block, etc., of any convenient form. If desired the upper and lower half of case 14 may comprise separable parts (not shown) bolted together for convenient assembly of the bearing. The shaft 10 is shown with an axial bore 12 which may extend entirely through the shaft 10 or merely from one end to the middle of the bearing. The bore 12 allows free escape of lubricating fluid (e. g., liquid or gas) after such has passed through the bearing. A rotatable connection (not shown) may be connected to the bore 12 so that escaping fluid may be collected and re-used if desired. The shaft 10 has an enlarged portion 16 which may be either integral with shaft 10 or pressed, shrunk or otherwise fastened thereto. Left and right end collars 18 and 20 are held against the shoulders of enlargement 16 by means of nuts 22 and 24. There is thus formed a restricted bearing area between collars 18 and 20 which is to be rotatably supported in a sleeve 26 allowing little clearance on the bearing area, both diametrically and longitudinally.

The sleeve 26 is made of a fluid-permeable material. As an example, but not by way of limitation, one such material which may be used is "Porex" made by the Moraine Products Division, General Motors Corporation, Dayton, Ohio. This material is of sintered, bronze grain and is customarily used for filters.

It is of the essence of this invention that the material of which sleeve 26 is made be a permeable material. For purposes of this invention a "permeable" material is one which has a large number of small interconnected pores. Such a material has myriads of small tortuous channels through which a fluid may be made to flow with an appreciable flow resistance which is evidenced by a substantial pressure drop.

Returning to Figure 1, the sleeve 26 has a reduced outer diameter at its center section and the outer flanges are firmly pressed into or clamped by the case 14. There is thus formed an annular channel 28 around the sleeve 26. A pressure fitting 30 may be threaded into the case 14 and serves to permit the lubricating fluid (e. g., liquid or gas) to have access to the annular channel 28 into which the lubricant is forced at high pressure by a pump (not shown). From the annular channel 28 the fluid is distributed to the outer surface of sleeve 26. The dimensions of the channel 28 and sleeve 26 may be so chosen that an approximately uniform thickness of permeable material lies between the chamber 28 and the various parts of the bearing surface, i. e., the parts 18, 16, and 20. If desired the annular channel may be cut out of the case part 14, or be formed by cutting into both parts 26 and 14. Furthermore, the bearing areas as well as the relative thicknesses of permeable material measured radially and endwise between the channel 28 and the bearing parts will depend on the relative radial and thrust loads to be accommodated as will become evident later.

The bearing shaft 16 is provided with a circumferential groove 32 and one or more approximately radial holes 34 drilled from groove 32 to the axial bore 12 of the shaft. While six such holes 34 are indicated in Figures 1 and 2, any number which will not appreciably weaken the shaft may be used. The groove 32 and the holes 34 are dimensioned to provide an escape path for substantially free efflux of the lubricant (e. g., liquid or gas)

after it has traversed the bearing surface. Lubricating fluid (e. g., liquid or gas) may also escape freely at circumferential regions 36 and 38. For a very long bearing several grooves such as 32 each with one or more radial openings to bore 12 may be employed. Furthermore, for large thrust bearings there may be several thrust collars such as collars 18 and 20 and they may have one or more annular grooves (not shown) with holes (not shown) which communicate with the axial bore 12, the function of such grooves and holes being the same as that served by groove 32 and holes 34.

Fluid under high pressure is supplied at fitting 30 and is distributed from annular channel 28 through the permeable filter-like material of sleeve 26 to the bearing surfaces, building up a pressure on the bearing surfaces and distributing itself around the periphery until it finds its way out via groove 32 and holes 34. It is preferred to arrange the radial flow resistance of the permeable sleeve to be approximately equal to the flow resistance of the bearing clearance, or expressed in another way the flowing fluid should suffer approximately half its pressure drop in flowing through the permeable sleeve 26 and the other half of its pressure drop in flowing along the very thin annular bearing clearance space to the outlet groove 32. This results in optimum centering control. It is essential for the operation of my invention that fluid flow takes place, since my invention does not depend on static properties of the fluid.

Control is effected by the changing bearing clearance effected by load and the effect of the changing clearance on the resistance to the fluid flow. Where clearance is relatively large the fluid may escape rapidly with relatively little resistance. Pressure in this region of the bearing is prevented from building up because the pressure is restrained by the resistance of the very closely knit filter-like material of which the sleeve 26 is made. Where clearance is small the flow resistance of the bearing clearance in this region is very high, thus holding back the fluid and developing a high pressure at this region. In the region where bearing clearance is small the fluid is restrained from flowing rapidly, hence there is little pressure drop in the adjacent region of sleeve 26 leaving a substantial pressure to hold the shaft away from the sleeve. Thus, a high supporting pressure is automatically developed at the points of greatest loading. Operation of the bearing is similar whether oil, water, gas, air or other fluid is used. It is to be noted that the perfection of lubrication depends on internal pressure regulation of the device, rather than on film continuity such as may be due to "tenacity" or "oiliness" of a liquid film. Indeed, the porous or discontinuous nature of the fluid-permeable sleeve 26 would tend to break up any static liquid lubricating film and fluid flow under substantial pressure is essential to this invention. This particular attribute however permits the bearing of my invention to be operated with a gas or air as the fluid, giving rise to the advantage that it may be operated with these fluids at high temperature.

Figure 4:
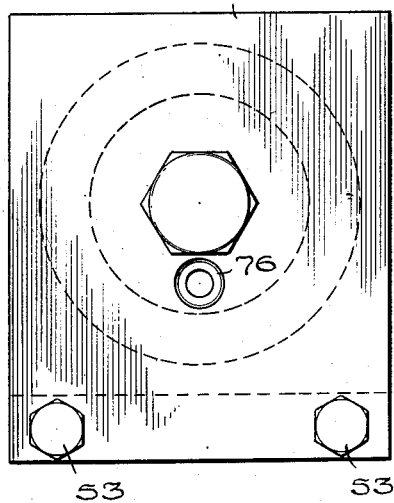
Figures 4 shows an end elevation of the embodiment of Figure 3.

Referring now to Figures 3 and 4, the base 50 together with end pieces 51 and 52 form a U-shaped bracket which assembly constitutes the load-bearing structure in this embodiment. End pieces 51 and 52 may be bolted to base 50 by means of bolts 53 for convenient assembly. It is apparent that the U-shaped structure thus formed may be part of any machine or other structure on which it is desired to mount a rotating shaft, the latter being represented in Figure 3 by the shaft 54. Each of the end pieces 51, 52 are drilled on the same center line to receive bolts 56 and 58. These bolts serve to hold frusto-conical shaft-supporting elements 60 and 62 to the inner sides of the U-shaped mounting by means of nuts 64 and 66. Gaskets 68 and 70 serve to provide a seal between the supporting elements 60 and 62, respectively, and may be made of deformable sealing material, such as lead, hard rubber or other gasket material. Washers 72 and 70 may be placed under the nuts 66 and 64, respectively, to prevent damage to the cones 60 and 62. The washers 72 and 74 may be made of deformable gasket material similar to the washers 68 and 70, or they may be of hard material with a thin gasket material placed between them and the adjacent member 60 or 62. The sides of the U-shaped bracket may be drilled and tapped as at 76 and 78 for fastening fittings through which fluid under high pressure is admitted. The conical shaft-supporting elements 60 and 62 are shown as having an outer frusto-conical shape and having a cavity 80 and 82 which is sufficiently large to communicate with the openings 76 and 78, respectively. The frusto-conical cups thus formed are drilled for mounting bolts 56 and 58. Fluid under high pressure supplied through openings 76 and 78 therefore has access to the inside of the shaft-support cups 60 and 62, respectively.

The frusto-conical cups 60 and 62 are made of a fluid-permeable material of a nature similar to sleeve 26 of Figures 1 and 2. Fluid introduced under pressure at openings 76 and 78 flows through the permeable material of which the cups 60 and 62 are made to the outer conical surface thereof.

The shaft 54 has internal conical surfaces 86 and 88 at its ends. These surfaces have the same conical taper as the outer surfaces of cones 60 and 62. The conical surfaces 86 and 88 have one or more annular grooves 90 which serve to collect the fluid which escapes from the outer surfaces of cones 60 and 62 and after it has traversed the bearing clearance, and communicates with the outside through holes 92 drilled from the grooves 90 to the outside of the shaft 54. Provision may be made to collect the fluid after it escapes from the holes 92 if it is desired to reuse the fluid. Such provision is not shown on the drawing in order to simplify the description and is not necessary if air or other innocuous gas is used as the lubricating fluid. In operation the bearing is supplied with pressure fluid from a pump (not shown) through pipes attached to openings 76 and 78 and a pressure drop occurs when the fluid flows through the permeable material 60 and 62, with a further pressure drop occurring when the fluid flows through the small clearance between the cups and the internal cone at surfaces 86 and 88 before reaching the collecting grooves 90 where it exhausts to the atmosphere.

Control is effected in a manner similar to that described with reference to Figures 1 and 2, in that at regions where the load is greatest the clearance between the conical surfaces tends to decrease which cuts down the escape of fluid in this region resulting in a substantial increase in pressure over the region. This occurs because with restricted flow less pressure is used up in traversing that region of the permeable material. Where the clearance is larger and the fluid may escape more rapidly through the conical bearing surface the pressure is prevented from building up because it is restrained by the flow resistance of the permeable material.

The fluid-permeable elements 60 and 62 may be made of any permeable material, such as the "Porex" previously mentioned. Refractory cones, e. g., conical grinding wheels, may serve successfully as bearing elements 60 and 62. The sleeve 26 of Figures 1 and 2 may also be made of such refractory fluid-permeable material if desired. Moreover, by eliminating any possibility of metal to metal contact in the bearing it is not necessary to depend on ordinary lubricating properties of the fluid employed. When the sleeve 26 of Figure 1 or the cones 60 and 62 of Figure 3 are made of refractory material or sintered metal the bearing provided by this invention will operate at high temperatures and may employ hot gases as the pressure fluid.

While I have illustrated specifically two embodiments of my invention, these are not to be considered as limiting the scope thereof. Other bearing arrangements and embodiments employing the principles of my invention will be evident to those skilled in the art. It is also to be understood that the fluid pressures employed and the areas of the bearing surfaces may be varied according to the magnitude of the loads to be accommodated and in consideration of appropriate safety factors.

What I claim as my invention is:

A rotatable bearing comprising two relatively-rotatable members having close clearance over a substantial bearing area, a fluid in said clearance, a substantially uniformly fluid-permeable member whose surface forms at least a part of said bearing area, means for supplying and distributing said fluid under super-ambient pressure to the pores of said fluid-permeable member over a region which is substantially equidistant from said bearing area, means for restricting escape of said fluid except at said bearing area, and means for releasing said fluid after it has traversed the clearance over a substantial portion of said bearing area, whereby said fluid undergoes partial pressure loss in flowing through said fluid-permeable member into the bearing area and subsequently undergoes further pressure loss in flowing through the clearance over said bearing area.

References Cited in the file of this patent

UNITED STATES PATENTS

| Number | Name | Date |
|---|---|---|
| 1,634,768 | Bonner | July 5, 1927 |
| 2,349,203 | Spencer | May 16, 1944 |
| 2,442,202 | Caley | May 25, 1948 |

FOREIGN PATENTS

| Number | Country | Date |
|---|---|---|
| 896,233 | France | Feb. 15, 1945 |